United States Patent

Meyer et al.

Patent Number: 5,928,400
Date of Patent: Jul. 27, 1999

[54] MOUNTING STRUCTURE FOR A BAFFLE OR THE LIKE IN A GLASSWARE MANUFACTURING MACHINE

[75] Inventors: Willi Meyer, Effretikon; Johann Zsifkovits, Forch, both of Switzerland

[73] Assignee: Emhart Glass S.A., Cham, Switzerland

[21] Appl. No.: 08/304,465

[22] Filed: Sep. 12, 1994

[30] Foreign Application Priority Data

Sep. 16, 1993 [GB] United Kingdom .................... 9319193

[51] Int. Cl.⁶ ........................................ C03B 1/00
[52] U.S. Cl. ..................... 65/172; 65/307; 65/323
[58] Field of Search .................... 65/323, 307, 359, 65/357, 172

[56] References Cited

U.S. PATENT DOCUMENTS

| | | | |
|---|---|---|---|
| 3,189,427 | 6/1965 | Schirm | 65/323 |
| 3,472,642 | 10/1969 | Irwin | 65/261 |
| 3,586,494 | 6/1971 | Mumford | 65/323 |
| 3,775,086 | 11/1973 | Muranaka | 65/323 |
| 3,934,998 | 1/1976 | Rowe | 65/172 |
| 4,466,821 | 8/1984 | Irwin et al. | 65/307 |
| 4,486,215 | 12/1984 | Irwin et al. | 65/360 |
| 4,528,017 | 7/1985 | Abott et al. | 65/240 |
| 4,655,813 | 4/1987 | Nebelung | 65/359 |
| 4,743,286 | 5/1988 | Nebelung | 65/242 |

*Primary Examiner*—Sean Vincent
*Attorney, Agent, or Firm*—Spencer T. Smith

[57] ABSTRACT

A mounting structure for use in a glassware forming machine for moving an operative member, such as a funnel, baffle or blowhead, between an out of the way and operative positions. The machine comprises a vertical operating shaft and a parallel support shaft, and the mounting structure comprises a first link adjustably mounted on the operating shaft and a second link slidably mounted on the support shaft. The two links are both pivoted to a head and form a parallel linkage with it. A key and keyway, maintains the first link in a desired angular relationship with the operating shaft. The head is provided with a releasable device by which the operative member may be secured to the head in a desired angular relationship.

3 Claims, 4 Drawing Sheets

MOUNTING STRUCTURE FOR A BAFFLE OR THE LIKE IN A GLASSWARE MANUFACTURING MACHINE

This invention is concerned with mounting means for use in a glassware manufacturing machine for an operative member such as a funnel, as a baffle or a blowhead.

BACKGROUND TO THE INVENTION

In a glassware manufacturing machine of the so-called "individual section" type, it is necessary to move operative members between out-of-the-way positions out of alignment with an opening of a cavity of a mould of the machine and operative positions in which the operative member is in alignment with the opening of the cavity and in close proximity thereto. For example, each section of the machine comprises a blank mould in which parisons are formed from gobs of molten glass, by either a pressing or a blowing operation, and it is necessary to move a funnel into alignment with the mould opening so that the funnel can guide a gob into the mould cavity. The funnel is then moved to an out-of-the-way position, to allow a baffle to close the mould cavity opening, The baffle is moved in a similar manner to the funnel in relation to the blank mould. A blowhead, though which air is blown into a finishing mould of the section and in which parisons transferred to the finish mould from the blank mould are blown into articles of glassware, is moved in a similar manner.

Conventional moving means for moving the funnel baffle and blowhead of a machine of the individual section type operates in a similar manner in each case. The moving means comprises a vertically disposed piston and cylinder assembly having a piston with two integral piston rods. One piston rod extends vertically-upwards providing a vertically-extending shaft on which the mounting means for the operative member is mounted for movement with the shaft. The other piston rod extends vertically downwards and carries a cam follower which engages a cam track shaped so that, during part of the movement of the piston along the cylinder, it is caused to turn so that the first-mentioned piston rod turns about a vertical longitudinal axis thereof. The mounting means for the operative member comprises an arm which extends horizontally and on which the operative member is mounted and clamping means by which the mounting means is clamped to the vertically-extending shaft so that the mounting means moves with the shaft. The arrangement is, thus, such that movement of the piston causes the upwardly-extending piston rod to move vertically and to turn about its longitudinal axis so that the operative member makes a movement which has a rotary component about a vertical axis and a linear component in a vertical direction, the linear component moves the operative member towards or away from the opening of the mould cavity while the rotary component moves it into or out of alignment with the opening.

It is necessary that the operative member, whether it be a blowhead, funnel or baffle, be consistently accurately located with respect to the mould if consistently good articles of glassware are to be produced. It is also desirable that fine adjustments to the operative position of the operative members can be made initially to obtain this accurate location. Further it is desirable that one operative member can without difficulty be replaced by another (whether it be for repair purposes or to enable a different article of glassware to be made) and the height of the operative member adjusted without requiring setting up or fine adjustment to the mounting means. In U.S. Pat. No. 3,586,494 a baffle mechanism in an individual section glassware manufacturing machine is described which comprises a vertically extending operating shaft, which is arranged to perform axial and rotary movements, and a parallel vertically extending support shaft. The mounting means for the baffle comprises a head for supporting the baffle, a first link having one end portion secured to the operating shaft and the other pivoted to the head, a second link having one end portion rotatably mounted on the supporting shaft and the other end portion pivoted to the head, the two links and the head forming a parallel linkage. This arrangement has the advantage that once it is set up, the parallel linkage obtains a consistent and accurate location of the baffle in its operative position on repeated use of the mechanism. However, if it is wished to exchange one set of baffles for another considerable difficulty is encountered. Firstly, to exchange the baffles the baffle head must be disassembled from the two links and a new one reassembled. To ensure that any manufacturing tolerances in the new head are allowed for, it may be necessary to make a fine adjustment to the length of the second link. It may also be necessary to adjust the height of the baffle head. This is achieved by releasing the first link from the operating shaft and re-securing it to the shaft at the required height. Before finally securing the first link to the operating shaft, its orientation with respect to the shaft must be carefully checked to ensure that the operative position of the baffle is correct.

It will be seen that changing the baffle head in the aforesaid mechanism is a lengthy and time consuming operation.

It is one of the objects of the present invention to provide a mounting means for an operative member which is not only consistent and accurate in operation but which also allows for the convenient exchange of operative members and adjustment of their operating position.

BRIEF DESCRIPTION OF THE INVENTION

The present invention provides a mounting means for use in a glassware forming machine for moving all operative members between an out of the way position and an operative position in alignment with a mould cavity opening of a mould of the machine, the machine comprising a vertically-extending operating shaft, means to cause the shaft to perform axial and rotary movements, and a parallel vertically-extending support shaft the mounting means comprising a first link having first and second end portions, releasable means for securing the first end portion of the first link to the operative shaft so that the first link is capable of adjustment up and down the operating shaft means between the first link and the operating shaft to maintain said link in a desired angular relationship with the shaft on such up and down adjustment a second link having a first end portion rotatably mounted on the supporting shaft and a second end portion of a head for supporting an operative member which head is pivoted to the second end portion of the first link and to the second end portion of the second link, the two links and the head forming a parallel linkage a releasable device on the head for supporting the operative member and which is constructed to ensure that the operative member is maintained in a desired angular relationship with the head.

BRIEF DESCRIPTION OF THE DRAWINGS

Two mounting means for a baffle will now be described with reference to the accompanying drawings to illustrate the invention by way of example.

In the drawings

DETAILED DESCRIPTION OF THE PREFERRED EMBODIMENTS

Figure 1:
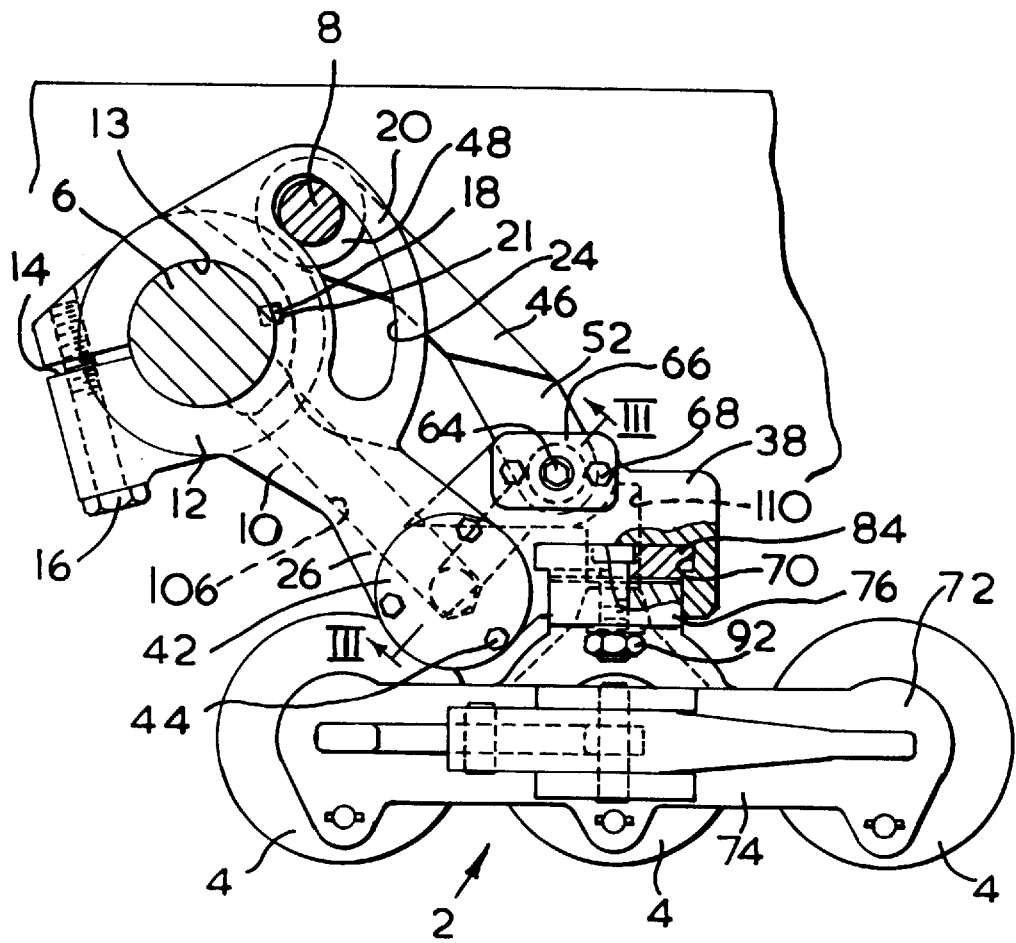
FIG. 1 shows a plan view of the first mounting means with a baffle head in its operative position.
Figure 2:
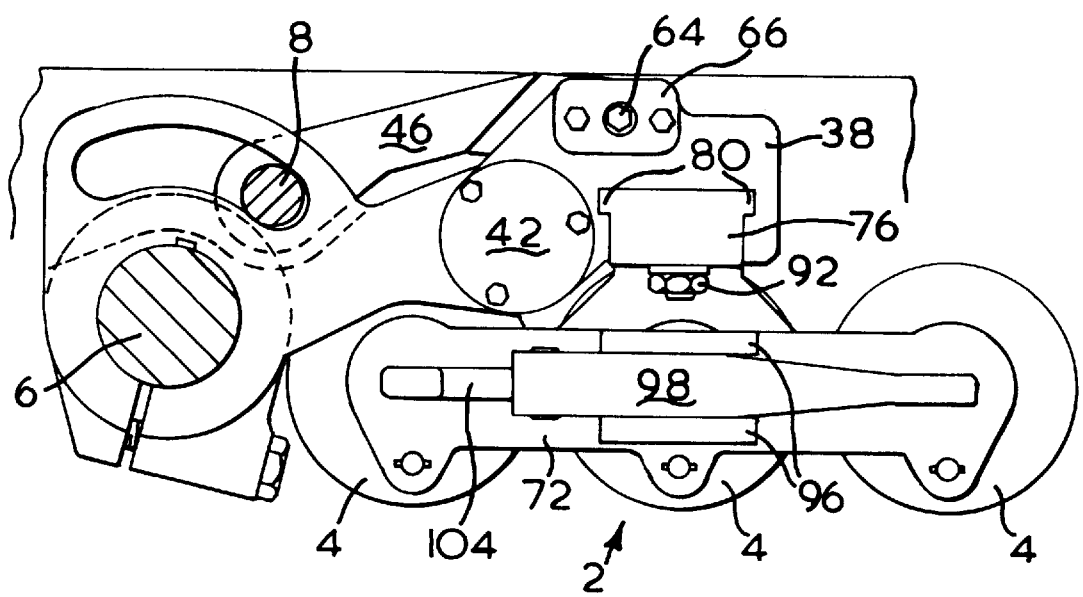
FIG. 2 shows a plan view corresponding to FIG. 1 with the baffle head in its out of the way position.
Figure 3:
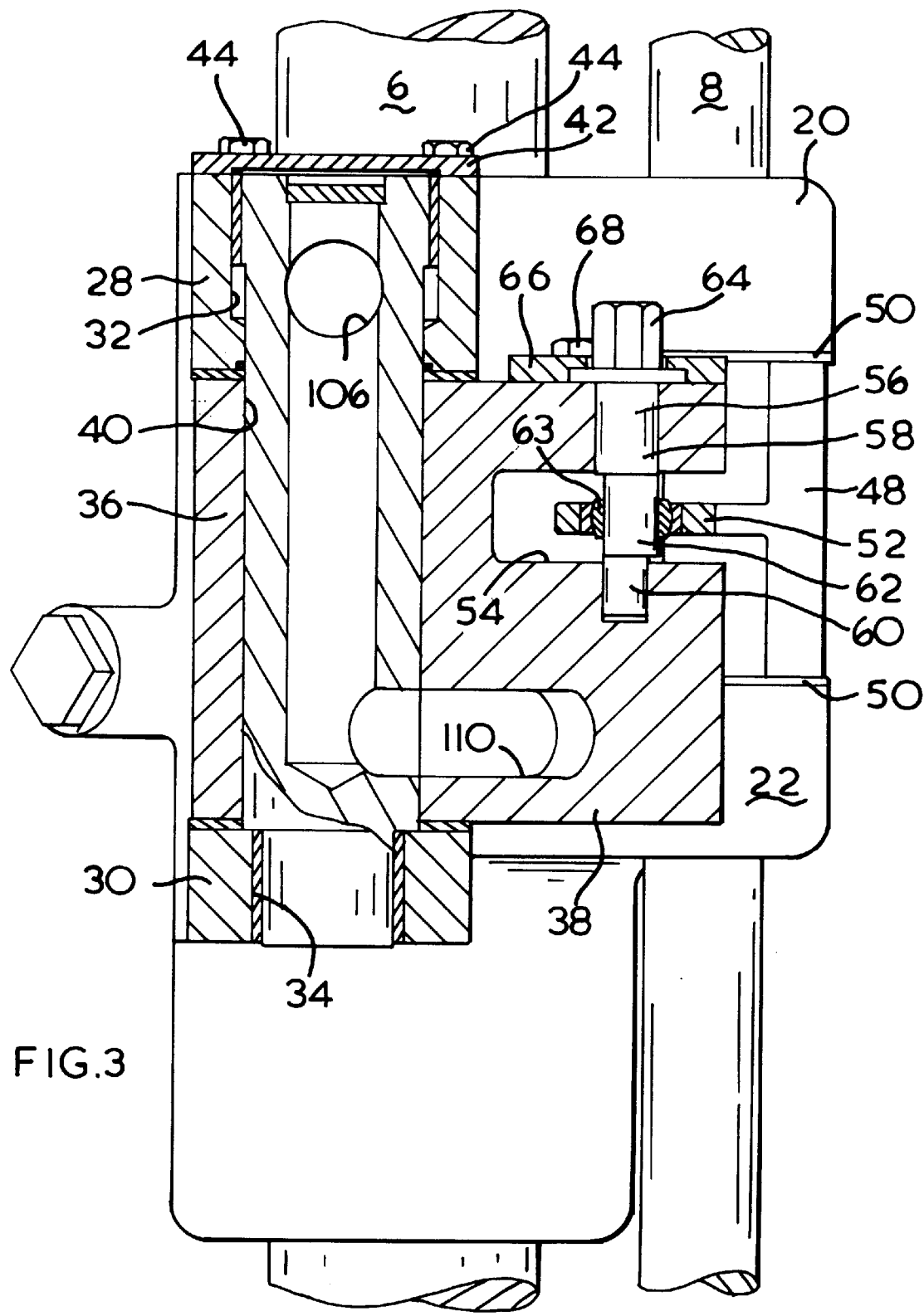
FIG. 3 shows a view, partly in section along the line III—III of FIG. 1 of the first mounting means attached to an operating shaft.
Figure 4:
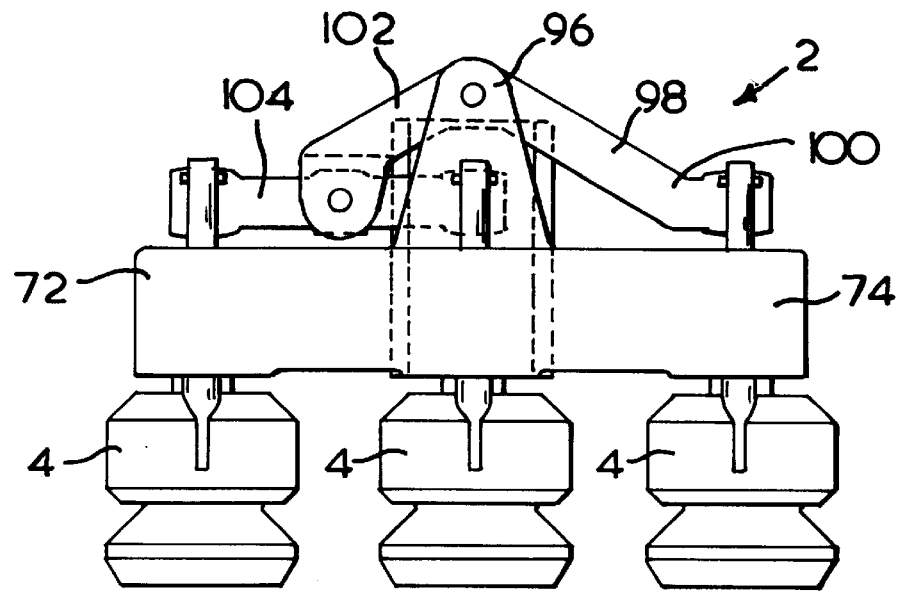
FIG. 4 shows a front view of the baffle head

The first mounting means shown in FIG. 1 is for use in a glassware forming machine, conveniently of the individual section type and is provided for moving an operative member, in the form of a baffle head 2 comprising three baffles 4 between an out of the way position and an operative position in which the baffles 4 are in alignment with mould cavity openings (not shown) of a parison mould of the machine. The baffle head 2 is for use with a triple gob machine and consequently comprises three baffles 4 corresponding with three mould cavities (not shown).

The glassware forming machine comprises a vertically extending operating shaft 6 which is caused, by a conventional piston and cylinder device (not shown) to perform axial and rotary movements, and a parallel, vertical, support shaft 8.

The mounting means comprises a first link 10 which has a first end portion 12 having a circular bore 13 which surrounds the shaft 6 and comprises a vertical slot 14. A bolt 16 extending across the slot 14 provides releasable means for securing the link 10 to the shaft 6. Means, in the form of a key 18 secured to the shaft 6 and a vertical keyway 21 opening into the bore 13 of the end portion 12 is provided between the shaft 6 and the link 10 and serves to maintain the link 10 in a desired angular relationship with the shaft 6. The link 10 may be adjusted up and down the shaft 6 maintained in the same orientation with respect to the shaft by slackening bolt 16, moving the link 10 and then tightening the bolt.

The first end portion 12 of the link 10 comprises two lugs 20,22 which extend circumferentially of the shaft 6 generally opposite the slot 14. These lugs are spaced apart vertically and each comprise an arcuate slot 24 which is centred on the shaft 6 and surrounds the shaft 8 and is of such a size that the lugs 20 22 may move freely past the shaft 8 without excessive play between the shaft 8 and the slots 24.

A second end portion 26 of the link 10 comprises two vertically spaced lugs 28, 30 each provided with bores 32, 34. A pin 36 extends through the bores 32,34 and a bore 40 in a support head 38 on which the baffle head is supported, thus pivoting the support head 38 to the first link 10. Appropriate bearing lugs are provided between the pin 36, the support head 38 and the link 10. A cover plate 42 is secured to the end portion 26 over the pin 36 by screws 44.

A second link 46 comprises a first end portion having a boss 48 rotatably and slidably mounted on the supporting shaft 8, with effectively no play. The boss 48 fits closely between the lugs 20 and 22 and bearing members 50 ensure free movement between the lugs 20,22 and the boss 48. The link 46 comprises a second end portion in the form of an arm 52 which extends into a slot 54 in the support head 38. A pivot pin 56 has concentric portions 58,60 which lie in co-axial bores of the support head 38, and an eccentric portion 62 which lies in a bearing 63 in a bore in the arm 52. The pin 56 has a hexagon head 64. A plate 66 overlies a flange of the head 64 and is secured by screws 68 to the support member 38. If the screws 68 are slackened, the pin 56 can be rotated, to obtain a fine adjustment of the effective length of the second link 46—and this adjustment may be preserved by tightening the screw 68 thus to make the plate 66 clamp the pin 56 in adjusted position. Alternatively a turn buckle could be provided to provide such fine adjustment.

It can thus be seen that the two links 10 and 46 and the support head 38 of the head 2 form a parallel linkage, and the first link, when adjusted up and down the shaft 6, is maintained in its desired angular relationship with the shaft, and such adjustment causes the link 46 to slide along the shaft 8 and carry the baffle head 2 with the links. Further, the location of the boss 48 of the second link 46 between the lugs 20 and 22 ensures that the link 46 moves precisely with the link 10 on up and down movement of the shaft 6.

Figure 5:
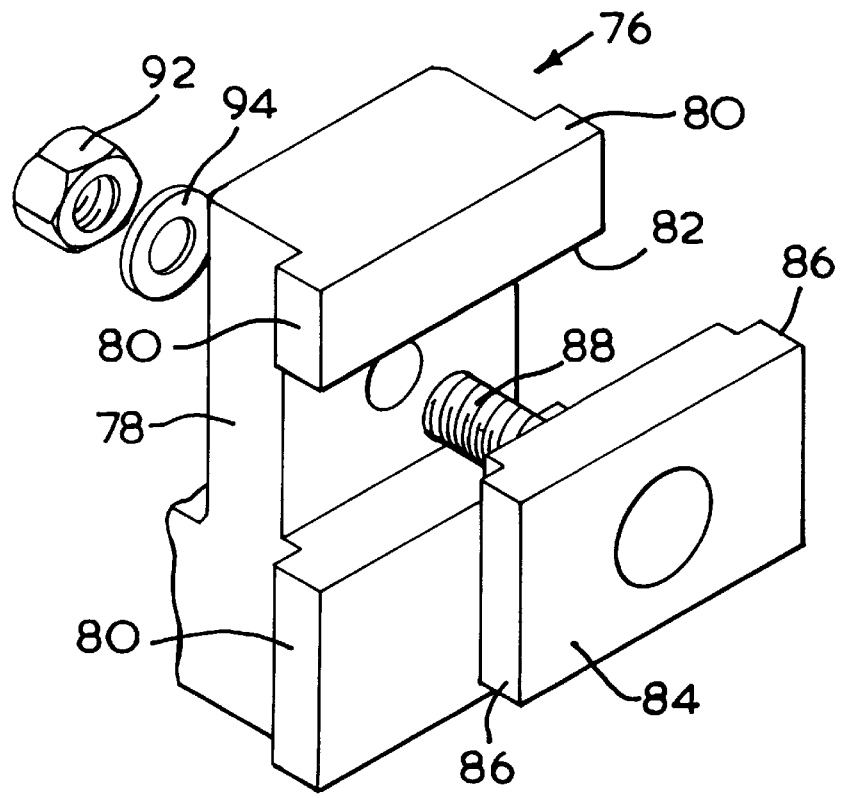
FIG. 5 shows diagrammatically an exploded view of a releasable device by which the baffle head is secured to the first mounting means.

The baffle head 2 is mounted on the support head 38. The support head 38 is provided with a T slot 70. The baffle head 2 comprises a supporting block 72 which is generally T shaped in plan and comprises a transverse portion 74 and a central lug portion 76. The lug portion 76 comprises an upwardly extending portion 78 (see FIG. 5) and is provided with transversely extending lugs 80 which are positioned above and below a transverse channel 82 and adapted to fit into the T slot 70. A locking member 84 which comprises transversely extending lugs 86 which also fit into the T slot 70 is provided with a threaded stem 88 which passes through a bore 90 in the portion 78, and is positioned as a fairly close fit in the channel 82. A nut 92 and locking washer 94 secure the member 84 in position in the channel 82. When the member 84 is so positioned in the channel 82 that the lugs 80 and 86 (which are the same size) are aligned, the supporting block 72 can be adjusted vertically with respect to the support member 38. On tightening the nut 92 the locking member 84 is drawn towards the portion 78, its thickness being slightly less than the depth of the channel 82, and the lugs 86 are forced against forward faces of the T slot 70, thus to clamp the block 72 securely in position.

The supporting block 72 comprises two upwardly extending lugs 96 between which is pivoted a balancing arm 98. The arm 98 is pivoted so that a portion 100 on one side of the pivot is twice the length of a portion 102 on the other side of the pivot. A second balancing arm 104 is pivoted at its mid point on the portion 102 of the balancing arm. End portions of the arm 104 and of the portion 100 of the arm 98 engage the baffles 4 which are mounted equally spaced in bores in the block 72, thus providing a balancing mechanism for the baffles when they are brought into engagement with the moulds.

The mounting means has been described as used in conjunction with a baffle head. It can also be used in conjunction with a funnel, or a blow head. To enable air to be supplied to the operative member, for example to supply settle blow air to a baffle head or final blow air to a blow head the mounting means is provided with air supplied through the shaft 6, a transverse passage 106 in the link 10, a central passage 108 through the pin 36, and a mounted passage 110 through the support member 38. In the mechanism described, where air is not required at the baffle head, no further extension of the air passageway is shown.

Figure 6:
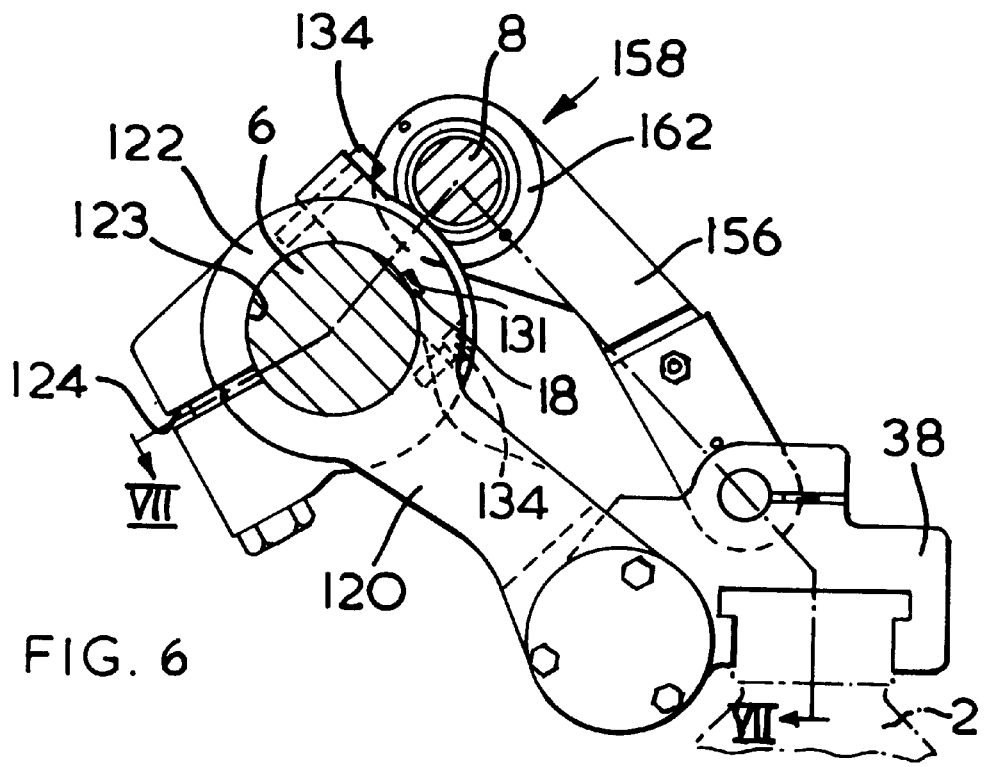
FIG. 6 shows a plan view of part of an alternative construction of mounting means.
Figure 7:
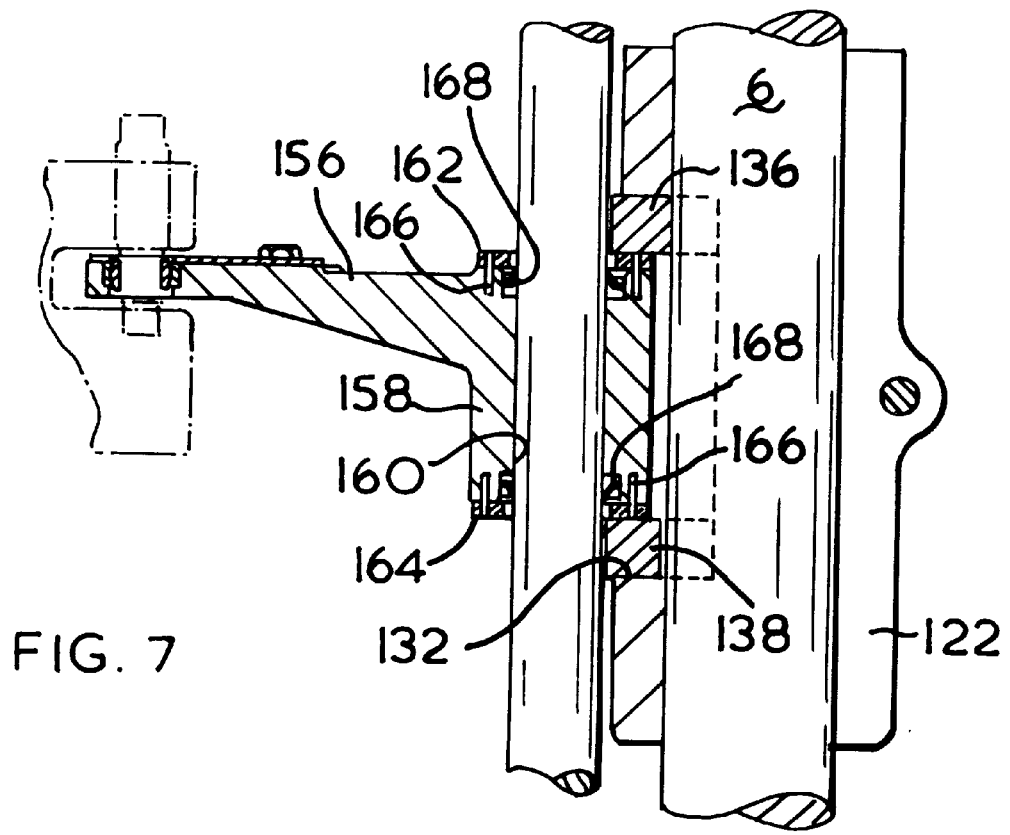
FIG. 7 shows a view in section along the line VII—VII of FIG. 6.

An alternative construction of the mounting means is shown in FIGS. 6 and 7. The alternative construction differs from the first mounting means only in the inter connection between links of the mounting means, and identical parts in the two constructions will be identified by the same numbers.

The alternative mounting means comprise a first link 120 having a first end portion 122 having a circular bore 123 which surrounds the shaft 6 and comprises a vertical slot 124. A bolt 126 extending across the slot 124 secures the link 120 to the shaft 6. A key 18 secured to the shaft 6 lying in a keyway 131 maintains the link 120 in a desired angular relationship with the shaft 6, and it may be adjusted up and down the shaft 6 in exactly the same way as the link 10.

The first end portion 122 comprises a cut away portion 132 in which are secured, by bolts 134, upper and lower arcuate bearing blocks 136, 138.

A second link 156 comprises a first end portion 158 which is rotatably and slidably mounted on the supporting shaft 8 with effectively no play. The first end portion 158 is the form of a boss having a bore 160 positioned on the shaft 8. The boss extends into the cut away portion 132 between the bearing blocks 136, 138, and bearing rings 162, 164 secured to the boss 158 by pins 166 fit closely and slidably against the blocks 136, 138 respectively. Scraping oil seals 168 are provided in annular recesses in the bore 160.

The two links 120, 156 support a support head 38 and a baffle head 2 in the same manner as the links 10 and 46 of the first mounting means. It can thus be seen that the two links 120 and 156, together with the support head 38, form a parallel linkage, and the first link 120 when adjusted up and down the shaft 6 is maintained in desired angular relationship with the shaft. Such adjustment causes the link 156 to slide on the shaft 8, and the location of the boss 158 of the second link 156 between the bearing blocks 136, 138 ensures that the link 156 moves precisely with the link 10 on up and down movement of the shaft 6.

We claim:
1. A baffle mechanism comprising a baffle head including
a support arm,
at least one baffle, and
means for supporting said at least one baffle on said support arm, a support head linkage means connected to said support head so that said support head can be displaced from a retracted position to an advanced position, and means for releasably securing said support arm to said support head with said support head and said support arm in selective alignment.

2. A baffle mechanism according to claim 1, wherein said releasably securing means includes a single nut.

3. A baffle mechanism according to claim 2, wherein said releasably securing means further includes a tongue and groove connection between said support arm and said support head.

* * * * *